United States Patent
Spyrou et al.

(10) Patent No.: US 11,453,744 B2
(45) Date of Patent: Sep. 27, 2022

(54) COMPOSITIONS CONSISTING OF BRØNSTED ACIDS AND MONOAMINES

(71) Applicant: Evonik Operations GmbH, Essen (DE)

(72) Inventors: Emmanouil Spyrou, Schermbeck (DE); Holger Loesch, Herne (DE); Andrea Thesing, Ahaus (DE); Andrea Diesveld, Gescher (DE); Susanne Kreischer, Herten (DE)

(73) Assignee: Evonik Operations GmbH, Essen (DE)

( * ) Notice: Subject to any disclaimer, the term of this patent is extended or adjusted under 35 U.S.C. 154(b) by 71 days.

(21) Appl. No.: 17/063,113

(22) Filed: Oct. 5, 2020

(65) Prior Publication Data

US 2021/0108026 A1 Apr. 15, 2021

(30) Foreign Application Priority Data

Oct. 15, 2019 (EP) .................................. 19203296

(51) Int. Cl.
*C08G 59/68* (2006.01)
(52) U.S. Cl.
CPC .................................. *C08G 59/687* (2013.01)
(58) Field of Classification Search
CPC .................................................. C08G 59/687
USPC ...................................................... 502/167
See application file for complete search history.

(56) References Cited

U.S. PATENT DOCUMENTS

| | | | |
|---|---|---|---|
| 3,492,269 | A | 1/1970 | Janssesn et al. |
| 4,775,734 | A | 10/1988 | Goel |
| 5,134,239 | A | 7/1992 | Bertram et al. |
| 5,441,000 | A | 8/1995 | Vatsky et al. |
| 5,470,896 | A | 11/1995 | Wegmann et al. |
| 5,629,380 | A | 5/1997 | Baldwin et al. |
| 8,980,979 | B2 | 3/2015 | Dettloff et al. |
| 2012/0115988 | A1 | 10/2012 | Spyrou et al. |
| 2019/0352449 | A1 | 11/2019 | Spyrou et al. |
| 2019/0352450 | A1 | 11/2019 | Spyrou et al. |
| 2019/0352451 | A1 | 11/2019 | Spyrou et al. |
| 2019/0352452 | A1 | 11/2019 | Spyrou et al. |
| 2020/0259137 | A1* | 8/2020 | Yao .................. C08G 59/54 |

FOREIGN PATENT DOCUMENTS

| | | |
|---|---|---|
| CA | 3107089 A1 | 3/2020 |
| EP | 0 083 813 A1 | 7/1983 |
| EP | 0 969 030 A1 | 1/2000 |
| EP | 2 957 584 A1 | 12/2015 |
| EP | 3 569 629 A1 | 11/2019 |
| EP | 3 569 630 A1 | 11/2019 |
| EP | 3 569 631 A1 | 11/2019 |
| EP | 3 569 632 A1 | 11/2019 |
| EP | 3 626 757 A1 | 3/2020 |
| GB | 1105772 | 3/1968 |
| WO | 96/09352 A1 | 3/1996 |
| WO | 2017/074810 A1 | 5/2017 |

OTHER PUBLICATIONS

European Search Report dated Mar. 11, 2021 in EP 20201282.9 (6 pages).
Römpp, Lexikon Chemie, 9. Auflage, Georg Thieme Verlag, Stuttgart, New York, 1991, p. 3459 (1 page).
Beyer Walter Lehrbuch der organischen Chemie, 21. Auflage, Hirzelverlag 1998, p. 272 (1 page).
Trummal et al., "Acidity of Strong Acids in Water and Dimethyl Sulfoxide," copyright 2016, J. Phys. Chem. A, pp. 3663-3669 (7 pages).
Tetrafluoroboric Acid, Encyclopedia of Reagents for Organic Synthesis, pp. 1-4 (4 pages)., 2001.
Holleman Wilberg, Lehrbuch der anorganischen Chemie, 91-100. Auflage, Walter der Gruyere Verlag, Berlin, New York, copyright 1985, p. 603 (1 page).
Römpp, Lexikon Chemie, 9. Auflage, Georg Thieme Verlag, Stuttgart, New York, 1998, pp. 4580-4581 (1 page).
Hexafluorophosphorsäure, pKs-Wert-10 (1 page), 2020.

\* cited by examiner

*Primary Examiner* — David T Karst
(74) *Attorney, Agent, or Firm* — Taylor English Duma LLP; Philip P. McCann

(57) ABSTRACT

The present invention provides compositions consisting of a) at least one metal salt, ammonium salt or phosphonium salt of a strong Brønsted acid and b) at least one primary aliphatic monoamine, processes for preparation thereof and use thereof.

10 Claims, No Drawings

US 11,453,744 B2

COMPOSITIONS CONSISTING OF BRØNSTED ACIDS AND MONOAMINES

CROSS REFERENCE TO RELATED APPLICATIONS

This application is a 35 U.S.C. § 119 patent application which claims the benefit of European Application No. 19203296.9 filed Oct. 15, 2019, which is incorporated herein by reference in its entirety.

FIELD

The present invention relates to compositions comprising strong Brønsted acids, to processes for preparation thereof and to the use thereof. Since the compositions according to the invention are of particularly good suitability as catalyst compositions, especially for the curing of epoxy resins, the present invention also provides catalyst formulations comprising strong Brønsted acids.

BACKGROUND

Epoxy resins, especially those that are prepared from bisphenol A and epichlorohydrin, are known raw materials for the production of high-quality casting resins, coating compositions, composites and adhesives. Aromatic epoxy resins cured with polyamines have not only good chemical and solvent resistance but also good bond strength on many substrates.

The curing of epoxy-amine coating systems can be accelerated using catalysts (U.S. Pat. Nos. 3,492,269 A, 5,470,896 A, GB 1,105,772 A).

EP 0 083 813 A1, EP 2 957 584 A1, U.S. Pat. Nos. 5,441,000 A, 5,629,380 A, WO 96/09352 A1 disclose the catalyzed curing of epoxy resins with various amines.

U.S. Pat. No. 8,980,979 B2 discloses the curing of an epoxy resin with, inter alia, a cyclic diamine selected from piperazine and homopiperazine, optionally in the presence of a catalyst.

EP 0 969 030 A1 discloses epoxy/amine coating systems wherein the amine component is an aliphatic amine. The compositions may include a catalyst.

U.S. Pat. No. 4,775,734 A discloses the curing of epoxy resins with aminoethylpiperazine using catalytic amounts of tetrafluoroborate or hexafluorophosphate salts of various amines. Also disclosed in comparative examples (Example 2) is an attempt to cure epoxy resins with aminoethylpiperazine in the presence of lithium tetrafluoroborate. However, there is no reaction at the ratio of epoxy groups:NH groups used.

A further example (example 14) discloses the reaction of ammonium hexafluorophosphate with diethylamine.

U.S. Pat. No. 5,134,239 A discloses adducts of heterocyclic nitrogen-containing compounds and salts. Example 58 discloses, as a noninventive example, the synthesis of a butylamine-tetrabutylphosphonium fluoroborate complex in methanolic solution.

WO 2017/074810 A1 discloses compositions comprising an epoxy resin, a polyetheramine and a further amine curing agent which may be an aliphatic amine inter alia, and optionally a metal triflate catalyst.

The applications EP 3 569 629 A1, EP 3 569 630 A1, EP 3 569 631 A1 and EP 569 632 A1 disclose compositions comprising at least one epoxy resin, at least one cyclic amine having at least two amino groups and at least one salt of a Brønsted acid.

SUMMARY

It is desirable to accelerate the curing of epoxy formulations with catalysts in order to be able to save energy and reaction time. It has been found that salts of strong Brønsted acids (i.e. those having a $pK_A$ not higher than 2) are particularly suitable, especially salts of very strong Brønsted acids (i.e. those having a $pK_A$ not higher than −9.01). They have the disadvantage, however, that they are solids and that they can only be homogenized with difficulty in the liquid epoxy formulations. Also disadvantageous is prior dissolution or dispersion in solvents—in the case of dispersion or dissolution of the catalysts in inert solvents, this increases the VOC (volatile organic content) of the epoxy compositions. Reactive solvents, by contrast, lead to precipitation, discoloration and reduction in reactivity.

The problem addressed by the present invention is thus that of providing compositions which contain the salts of strong Brønsted acids that are of very good suitability as catalysts of epoxy formulations and which do not have the aforementioned disadvantages.

It has been found that, surprisingly, salts of strong or very strong Brønsted acids, especially salts of trifluoromethanesulfonic acid (triflate), have good solubility in primary aliphatic monoamines. It has been found here that, surprisingly, primary aliphatic monoamines dissolve the salts mentioned far better than secondary aliphatic monoamines or other monoamines.

DETAILED DESCRIPTION

The present invention thus provides compositions consisting of a) at least one metal salt, ammonium salt or phosphonium salt of a strong Brønsted acid and b) at least one primary aliphatic monoamine.

The compositions preferably have 10-95% by weight of component a) and 5-90% by weight of component b), based on the weights of components a) and b). The compositions further preferably have 30-70% by weight of component a) and 70-30% by weight of component b), based on the weights of components a) and b), even further preferably 40-60% by weight of component a) and 60-40% by weight of component b), based on the weights of components a) and b).

The compositions according to the invention comprise at least one metal salt, ammonium salt or phosphonium salt of a strong Brønsted acid. Corresponding salts are good catalysts. Such a strong acid in the present context is understood to mean a salt having a pKa (or in the case of polyprotic acids having a pKa of the first protolysis stage) of not more than 2. Preferably, the pKa of the corresponding acid is not more than −2.

The pKa is defined as the negative decadic logarithm of the equilibrium constant Ka and is considered to be a measure of the strength of an acid. The smaller a pKa, the stronger the acid. The $pK_A$ is determined as disclosed in F. G. Bordwell, "Equilibrium Acidities in Dimethylsulfoxide Solution", *Acc. Chem. Res.* 1988, 21, 456-463.

Preferred salts are the corresponding salts of the strong acids collated in the first column in Table 1 below:

TABLE 1

| Acid | $pK_A$ | Literature reference, if not disclosed in Bordwell |
|---|---|---|
| Oxalic acid | 1.5 | Beyer Walter, Lehrbuch der organischen Chemie [Organic Chemistry], 21st edition, Hirzelverlag 1988, p. 324 |

TABLE 1-continued

| Acid | pK$_A$ | Literature reference, if not disclosed in Bordwell |
|---|---|---|
| p-Toluenesulfonic acid | 0.7 | Römpp Lexikon Chemie [Römpp's Chemical Lexicon], 10th edition, Georg Thieme Verlag, Stuttgart, New York, Verlag 1999, p. 4580-1. |
| Trifluoroacetic acid | 0.2 | Beyer Walter, Lehrbuch der organischen Chemie [Organic Chemistry], 21st edition, Hirzelverlag 1988, p. 272 |
| Tetrafluoroboric acid | −0.4 | e-EROS Encyclopedia of Reagents for Organic Synthesis, Pages 1-4, Conference; General Review; Online Computer File, 2001 |
| Nitric acid | −1.4 | Hollemann Wiberg, Lehrbuch der anorganischen Chemie [Inorganic Chemistry], 91st-100th edition, Walter de Gruyter Verlag, Berlin, New York, 1985, p. 603. |
| Sulfuric acid | −3 | Römpp Lexikon Chemie, 9th edition, Georg Thieme Verlag, Stuttgart, New York 1991, p. 3459. |
| Hydrochloric acid | −8 | |
| Hydrobromic acid | −9 | |
| Perchloric acid | −10 | Hollemann Wiberg, Lehrbuch der anorganischen Chemie [Inorganic Chemistry], 91st-100th edition, Walter de Gruyter Verlag, Berlin, New York, 1985, p. 428 |
| Trifluoromethan-esulfonic acid | −14 | |
| Hydrogen iodide | −9.5 | Journal of Physical Chemistry A, Volume 120, Issue 20, Pages 3663-3669. |
| Hexafluorophos-phoric acid | −10 | http://www.periodensystem-online.de/index.php?sel=wertdesc&prop=pKs-Werte&show=list&id=acid |
| Hexafluoroan-timonic acid | −17 | http://www.periodensystem-online.de/index.php?sel=wertdesc&prop=pKs-Werte&show=list&id=acid |

Preferably, the salt is the salt of a very strong acid, such a very strong acid in the present context being understood to mean an acid having a pKa (or in the case of polyprotic acids having a pKa of the first protolysis stage) of not higher than −9.01. Preferably, the pKa of the very strong acid is between −9.5 and −25, more preferably between −9.9 and −21.

Most preferably, component a) is a salt of a Brønsted acid selected from perchloric acid, trifluoromethanesulfonic acid, hydrogen iodide, hexafluorophosphoric acid and hexafluoroantimonic acid.

Even further preferably, the salt is a triflate, i.e. a salt of trifluoromethanesulfonic acid.

The strong Brønsted acids are metal, ammonium or phosphonium salts. Metal salts are understood here to mean both salts containing metal ions (i.e. having at least one ion derived from at least one metal, preferably having an ion derived from at least one metal atom, more preferably having exactly one ion derived from at least one metal atom) and metal-containing ions (i.e. also having nonmetallic components). The counterions of the acids mentioned are thus selected from metal ions, metal-containing ions, phosphonium ions and ammonium ions.

Preferred metal ions are alkaline earth metal cations, especially beryllium, magnesium, calcium, strontium and barium ions, and lithium, aluminium, bismuth, zinc and europium ions.

Metal-containing ions are ions that contain at least one metal but are not pure metal ions. They are preferably metal compound ions, for example tetraphenylstibonium ions.

Ammonium ions may be unsubstituted (=NH$_4^+$), alkylated and/or arylated. Phosphonium ions may be unsubstituted (=PH$_4^+$), alkylated and/or arylated. A preferred ammonium ion is NH$_4^+$. A preferred phosphonium ion is PH$_4^+$. Very particular preference is given to ammonium ions.

Preferred salts of strong acids are calcium triflate, europium triflate, barium triflate, aluminium triflate, bismuth triflate, lithium triflate, lithium perchlorate, barium perchlorate, lithium hexafluorophosphate and zinc perchlorate. Very particular preference is given to calcium triflate, europium triflate, lithium hexafluorophosphate and lithium perchlorate.

The best results are achieved with calcium triflate.

The compositions also include at least one primary aliphatic monoamine. A primary aliphatic monoamine is understood in the present context to mean a primary monoamine (i.e. an amine having only one primary amino group) having exclusively aliphatic, i.e. linear or branched, alkyl radicals, cycloalkyl radicals and/or (cyclo)alkyl radicals. (Cyclo)alkyl radicals are understood here to mean radicals having both cyclic and linear or branched alkyl moieties. Preferred aliphatic radicals each have 3 to 30, more preferably 3 to 10, most preferably 3-6, carbon atoms. The monoamines may be substituted by a hydroxy radical on one of their alkyl, cycloalkyl, and/or (cyclo)alkyl radicals. However, no other substituents are present. Preferably, in addition, all aliphatic radicals of the monoamine are unsubstituted.

Preference is given to using monoamines having a boiling point (measured at 1013.25 hPa) of 30-300° C., preferably 30-200° C.

The monoamine is most preferably selected from the group consisting of n-propylamine, isopropylamine, n-butylamine, sec butylamine, tert butylamine, n-pentylamine, n-hexylamine and ethanolamine.

Even further preferably, the monoamine is n-butylamine.

The best results are achieved when component a) is calcium triflate and component b) is n-butylamine.

The present invention further provides a process for preparing the composition according to the invention, in which a) at least one metal salt, ammonium salt or phosphonium salt of a strong Brønsted acid and b) at least one aliphatic monoamine are mixed with one another, optionally in the presence of further components.

The present invention also further provides for the use of a composition of the invention as catalyst composition. The compositions of the invention are especially suitable as catalyst compositions for the curing of epoxy resins, very preferably for the curing of epoxy resins with amines.

EXAMPLES

Example 1

To demonstrate the particular reactivity of the catalysts claimed, model experiments are compared with one another. For this purpose, 0.025 mol (3.75 g) of 1,2-epoxy-3-phenoxypropane is added to a mixture of 22.7 g of toluene (solvent) and 2.08 g of tetradecane (internal standard). To this are added 0.025 mol (2.13 g) of piperidine, and 0.06 g of calcium triflate dissolved in the same amount of amine, or alcohol as comparison. Immediately after the mixing, a GC is taken and the content of 1,2-epoxy-3-phenoxypropane is compared with the content of tetradecane. After 4 h at room temperature (RT), by means of GC analysis, the residual content of 1,2-epoxy-3-phenoxypropane (EP) is ascertained (calibrated by the internal tetradecane standard). This gives the following results:

Comparison of the catalysts

| | Amine or alcohol | Residual % EP in the 0 sample | Residual % EP after 4 hours at RT |
|---|---|---|---|
| 1 | No amine or alcohol | 97 | 0 |
| 2 | Butylamine | 78 | 3 |
| 3 | Hexylamine | 75 | 4 |
| 4 | Octylamine | 76 | 4 |
| 5 | 3-Methylpropylamine | 83 | 4 |
| 6 | 2-Ethylhexylamine | 78 | 5 |
| 7 | 2-Ethylpropylamine | 85 | 6 |
| 8 | n-Pentylamine | 77 | 2 |
| 9 | Ethanolamine | 78 | 8 |
| Comp. 1 | Ethanol | 89 | 32 |
| Comp. 2 | Ethylene glycol | 89 | 32 |
| Comp. 3 | Propanediol | 86 | 46 |
| Comp. 4 | Butanediol | 96 | 31 |
| Comp. 5 | Ethylenediamine | 90 | 33 |

The claimed monoamines are suitable as solvents for calcium triflate and do not lead to any significant decrease in reactivity (residual EP content after 4 hours not more than 10%). Pure alcohols, dialcohols or diamines lead, by comparison, to a distinct decrease in reactivity.

The invention claimed is:

1. A composition consisting of
   a) at least one metal salt, ammonium salt or phosphonium salt of a strong Brønsted acid and
   b) at least one primary aliphatic monoamine.

2. The composition according to claim 1,
   wherein
   the composition has from 10 to 95% by weight of component a) and 5-90% by weight of component b), based on the weights of components a) and b).

3. The composition according to claim 1,
   wherein
   the at least one metal salt a) is a salt of an acid selected from the group consisting of oxalic acid, p-toluenesulfonic acid, trifluoroacetic acid, tetrafluoroboric acid, nitric acid, sulfuric acid, hydrochloric acid, hydrochloric acid, perchloric acid, trifluoromethanesulfonic acid, hydrogen iodide, hexafluorophosphoric acid and hexafluoroantimonic acid.

4. The composition according to claim 1,
   wherein
   the Brønsted acid has a $pK_A$ not higher than −9.01.

5. The composition according to claim 1,
   wherein
   the at least one primary aliphatic monoamine b) has exclusively aliphatic radicals having from 3 to 30 carbon atoms.

6. The composition according to claim 1,
   wherein
   the at least one primary aliphatic monoamine b) has a boiling point, measured at 1013.25 hPa, of from 30 to 300° C.

7. The composition according to claim 1,
   wherein
   the at least one primary aliphatic monoamine b) is selected from the group consisting of n-propylamine, isopropylamine, n-butylamine, sec butylamine, tert butylamine, n-pentylamine, n-hexylamine and ethanolamine.

8. The composition according to claim 1,
   wherein
   the at least one metal salt a) of the strong Brønsted acid is calcium triflate, and
   the at least one primary aliphatic monoamine b) is n-butylamine.

9. The composition according to claim 1,
   wherein
   the at least one metal salt a) is calcium triflate and at least one primary aliphatic monoamine b) is n-butylamine.

10. The process for preparing the composition according to claim 1, in which a) at least one metal salt, ammonium salt or phosphonium salt of a strong Brønsted acid and b) at least one primary aliphatic monoamine are mixed with one another.

* * * * *